United States Patent
Waheed (10) Patent No.: US 9,766,965 B2
(45) Date of Patent: Sep. 19, 2017

(54) SYSTEM AND METHOD FOR MONITORING AND DETECTING FAULTY STORAGE DEVICES

(71) Applicant: salesforce.com, inc., San Francisco, CA (US)

(72) Inventor: Abdul Waheed, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 112 days.

(21) Appl. No.: 14/952,190

(22) Filed: Nov. 25, 2015

(65) Prior Publication Data

US 2017/0147425 A1    May 25, 2017

(51) Int. Cl.
  *G06F 11/00* (2006.01)
  *G06F 11/07* (2006.01)
  *G06F 3/06* (2006.01)
  *G06F 11/20* (2006.01)
  *G06F 11/14* (2006.01)

(52) U.S. Cl.
  CPC ........ *G06F 11/0772* (2013.01); *G06F 3/0617* (2013.01); *G06F 3/0653* (2013.01); *G06F 3/0689* (2013.01); *G06F 11/008* (2013.01); *G06F 11/0727* (2013.01); *G06F 11/0751* (2013.01); *G06F 11/142* (2013.01); *G06F 11/2033* (2013.01); *G06F 11/2069* (2013.01); *G06F 11/2094* (2013.01)

(58) Field of Classification Search
  CPC .... G06F 11/2094; G06F 11/008; G06F 11/07; G06F 11/2069; G06F 11/142; G06F 11/2033; G06F 11/2046; G06F 11/2089
  See application file for complete search history.

(56) References Cited

U.S. PATENT DOCUMENTS

| | | | |
|---|---|---|---|
| 4,091,455 A | * | 5/1978 | Woods ............... G06F 11/0745 714/25 |
| 5,577,188 A | | 11/1996 | Zhu |
| 5,608,872 A | | 3/1997 | Schwartz et al. |
| 5,649,104 A | | 7/1997 | Carleton et al. |
| 5,715,450 A | | 2/1998 | Ambrose et al. |
| 5,761,419 A | | 6/1998 | Schwartz et al. |
| 5,819,038 A | | 10/1998 | Carleton et al. |
| 5,821,937 A | | 10/1998 | Tonelli et al. |
| 5,831,610 A | | 11/1998 | Tonelli et al. |

(Continued)

*Primary Examiner* — Charles Ehne
(74) *Attorney, Agent, or Firm* — Lorenz & Kopf, LLP (57) ABSTRACT

In an enterprise environment that includes multiple data centers each having a number of first servers, computer-implemented methods and systems are provided for detecting faulty storage device(s) that are implemented as redundant array of independent disks (RAID) in conjunction with each of the first servers. Each first server monitors lower-level health metrics (LHMs) for each of the storage devices that characterize read and write activity of each storage device over a period of time. The LHMs are used to generate high-level health metrics (HLMs) for each of the storage devices that are indicative of activity of each storage device over the period of time. Second server(s) of a monitoring system can use the HLMs to determine whether each of the storage devices have been inactive or active, and can generate a fault indication for any storage devices that were determined to be inactive while storage device(s) at the same first server were determined to be active.

20 Claims, 5 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162048 A1* | 10/2002 | Ackaret ............... G06F 11/008 714/4.5 |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0010500 A1* | 1/2008 | Shimmitsu ........ G06F 11/1662 714/6.32 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0143167 A1* | 5/2015 | Maeda ............... G06F 11/2094 714/6.22 |
| 2016/0098330 A1* | 4/2016 | Mu ...................... G06F 3/0619 714/6.23 |
| 2016/0127467 A1* | 5/2016 | Mu ...................... H04L 67/1097 709/213 |

(56) References Cited

U.S. PATENT DOCUMENTS

2016/0170846 A1* 6/2016 Hands ................. G06F 11/1662
714/6.3
2017/0124167 A1* 5/2017 Pasupathy ......... G06F 17/30572

* cited by examiner

SYSTEM AND METHOD FOR MONITORING AND DETECTING FAULTY STORAGE DEVICES

TECHNICAL FIELD

Embodiments of the subject matter described herein relate generally to computer implemented methods, computer systems and applications for detecting a faulty storage device, and, more particularly, to methods, computer systems and applications for monitoring storage devices at servers in a data center and detecting faulty storage devices at those servers.

BACKGROUND

Many organizations are moving toward cloud-based services and infrastructure as to provide on-demand services. Many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over the network "as a service" supplied by the infrastructure provider. The infrastructure provider typically abstracts the underlying hardware and other resources used to deliver an enterprise-developed application so that the enterprise no longer needs to operate and support dedicated server hardware. The cloud computing model can often deliver substantial cost savings to the enterprise over the life of the application because the enterprise no longer needs to provide dedicated network infrastructure, electrical and temperature controls, physical security and other logistics in support of dedicated server hardware.

A data center is a facility that centralizes an organization's IT operations and equipment, and where it stores, manages, and disseminates its data. A data center includes equipment, such as servers for IT operations and storage hardware for storage of an organization's data. Detecting failures of equipment that is used in such data centers is important to help ensure reliability.

Cloud applications increasingly depend on large volumes of data, which requires multiple tiers of storage. Multiple tiers of storage can differ in terms of their cost, capacity, latency, reliability, and power consumption characteristics. These tiers can include memory, flash memory, single disk storage, redundant array of independent disks (RAID) based storage, network-attached storage (NAS) devices, and storage area networks (SAN).

RAID storage is a data storage technology that provides a way of storing the same data redundantly in different places on multiple storage devices. These storage devices are typically hard disk drive storage devices or in some cases solid-state storage devices (SSDs). RAID storage can provide fault tolerance by combining multiple storage devices into a single logical unit, or array, so that data can be mirrored at each of the storage devices in the same array. This way, if one storage device fails the data is still preserved. RAID storage can also help improve overall performance, and increase storage capacity in a system. In a typical data center, RAID-based storage systems are indispensable due to their lower cost and higher volume.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Compared to rest of the computing infrastructure, failures are more likely for storage devices especially those that include mechanical parts, such as disks that are commonly used in RAID-based storage systems. Therefore, it is important to keep a close watch on their health and performance.

In a cloud-based data center a server cluster can include thousands of storage devices. It is quite difficult to detect a faulty storage device among such a large number of storage devices in such a distributed system such as a cloud-based data center. Faults are often uncovered as a result of unrelated, application-level anomalies, which require expensive and tedious investigations to detect. As such, there is a need for improved methods and systems that can be used detect faulty storage devices that are implemented in conjunction with servers that are part of a cloud-based data center in an enterprise computing environment.

Embodiments of the subject matter described herein generally relate to computer-implemented methods and systems for detecting faulty storage device(s) in an enterprise computing environment having one or more data centers that each include a number of first servers, where each first server is associated with redundant array of independent disks (RAID) that is implemented in conjunction with that first server and includes multiple storage devices. Servers that generate and process the lower-level health metrics to generate high-level health metrics are referred to herein as "first" servers, whereas other servers that that maintain a global view of the high-level health metrics and detect faulty storage devices are referred to herein as "second" servers. The terms "first" and "second" are used herein to distinguish between the different roles played by various servers in terms of the services they provide. The terms "first" and "second" are not intended to be limiting or imply that the servers are different unless clearly indicated by the context. In some implementations, although the first servers and second servers can provide different services, they can belong to a single stock keeping unit (SKU) and use the same underlying hardware.

Each of the first servers can sample lower-level health metrics for each of the storage devices at that first server at regular intervals. For a particular storage device, the lower-level health metrics characterize read and write activity of that particular storage device over a period of time. At each data center a local metric collection database collects the lower-level health metrics from each of the first servers that are part of that data center, and forwards them to a database that serves as a main metric collection point and stores all of the lower-level health metrics. Each of the first servers can then process the lower-level health metrics for each particular storage device to generate high-level health metrics for each particular storage device. The high-level health metrics for each particular storage device are derived information that is indicative of volume of I/O activity and usage of that particular storage device over the period of time.

The second servers of the monitoring system can then use the high-level health metrics to detect faulty storage devices within the various data centers of the enterprise computing environment. For example, in one embodiment, for each particular storage device, a second server of the monitoring system can determine, based on a combination of the high-level health metrics for that particular storage device, whether it has been active or inactive over an extended period of time. Then, for each of the storage devices that are determined to have been inactive over the extended period of time, the second server of the monitoring system can determine if one or more of the other storage devices at the same first server have been determined to have been active over the same extended period of time. When another storage device at the same first server is determined to have been active during the same extended period of time, the second server of the monitoring system can generate a fault indication for that storage device (that was determined to be inactive over the extended period of time). Each fault indication can indicate that a particular storage device has failed and can include a device identifier that identifies that particular storage device.

Figure 1A:
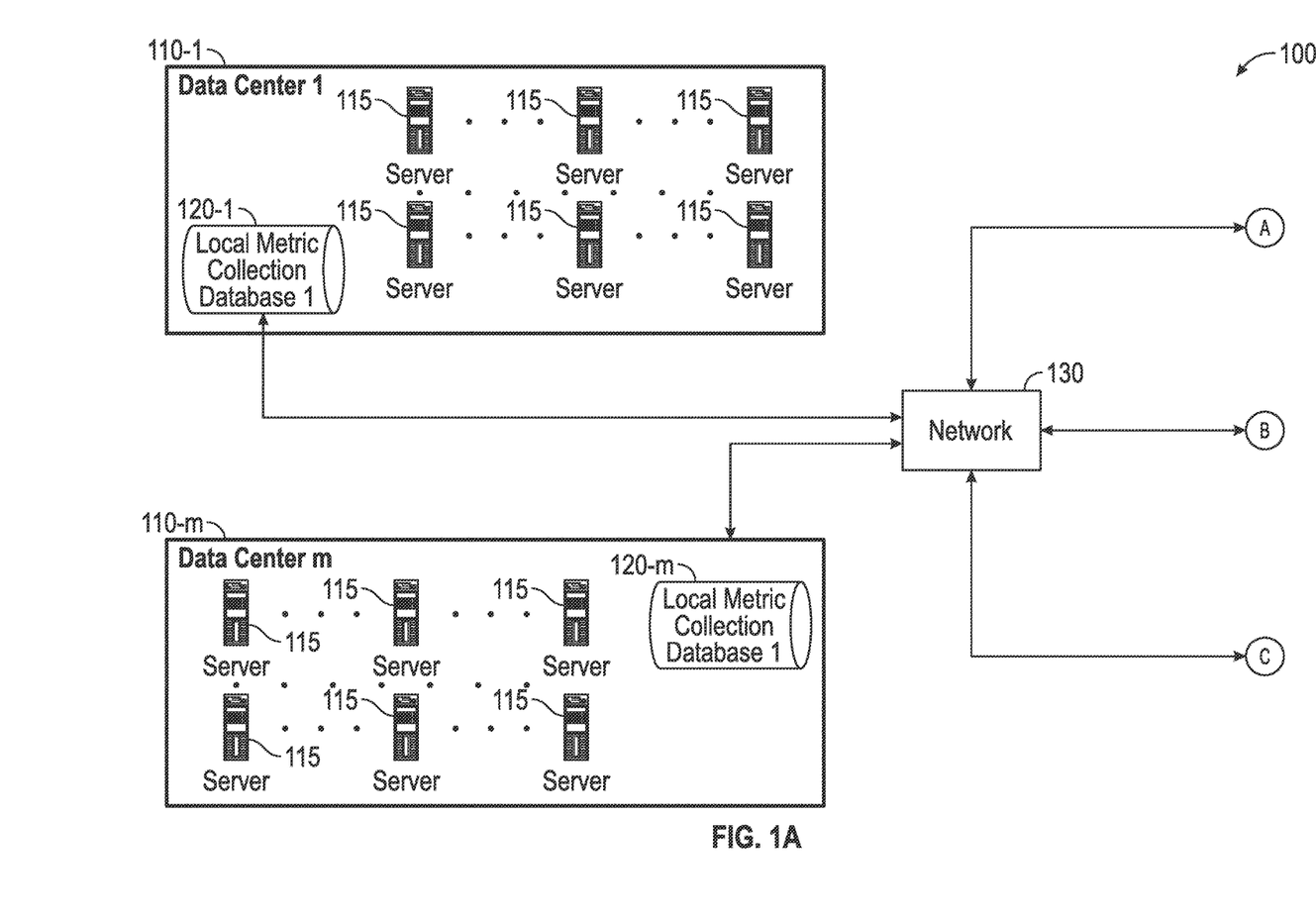
FIGS. 1A and 1B are a schematic block diagram of data centers that are part of a system in which the disclosed embodiments can be implemented.
Figure 1B:
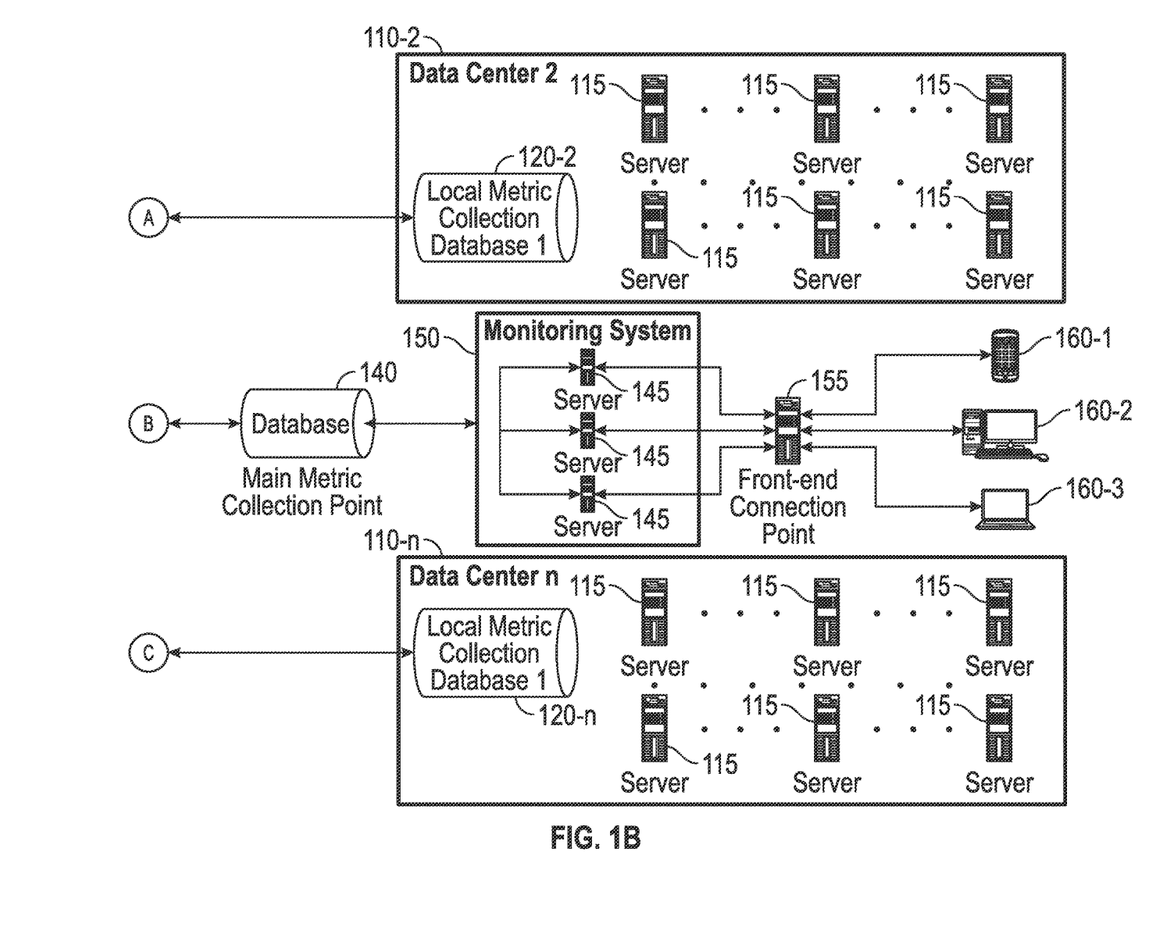

FIGS. 1A and 1B are collectively a schematic block diagram of a cloud-based computing system 100 that includes a number of data centers 110 in which the disclosed embodiments can be implemented. FIGS. 1A and 1B and the following discussion are intended to provide a brief, general description of one non-limiting example of a computing system in which the embodiments described herein may be implemented. Those skilled in the art will appreciate that the embodiments described herein may be practiced with other computing systems.

The cloud-based computing system 100 includes a plurality of data centers 110, network 130, a database 140, monitoring system 150, and a front-end connection point 155 that communicatively couples multiple client devices 160 to the monitoring system 150. The client devices can be computers such as desktop computers, laptop computers, tablet computers, smartphones, etc. that are used by people such as system administrators, site reliability engineers, and development operations engineers who are collectively responsible for the health of cloud-based services provided by the cloud-based computing system 100.

Each data center 110 includes a number of servers 115 (also referred to herein as "first servers" to distinguish them from the servers 145 that are part of the monitoring system 150) and a local metric collection database 120. Although four instances of data center 110 are shown to illustrate an example, it should be appreciated that any number of data centers 110 can be included. As will be described below with reference to FIG. 2, each server 115 can have a redundant array of independent disks (RAID), referred to herein as a RAID-based storage system, is either part of that server 115 or coupled to it. Each RAID-based storage system has multiple storage devices such as hard disks or solid state storage devices.

As will be explained below with reference to FIG. 2, each server 115 can also include one or more processing systems (also referred to as a processor herein) that is configured to monitor and sample lower-level health metrics for each of the storage devices at that server 115. Each storage device has a device identifier that identifies that storage device and the lower-level health metrics for each storage device can be associated with this device identifier. In one embodiment, these lower-level health metrics can include, for example, a cumulative number of reads made by each storage device during a period of time, a cumulative number of writes completed by each storage device during the period of time, a cumulative volume of reads made by each storage device during the period of time (e.g., total number of bytes read), a cumulative volume of writes completed by each storage device during a period of time (e.g., total number of bytes written), cumulative time spent in I/O (e.g., total time spent reading and the total time spent writing in milliseconds), etc.

Each of the servers 115 can process the lower-level health metrics to generate high-level health metrics. The high-level health metrics for each particular storage device are derived information that is indicative of volume of I/O activity and usage of that particular storage device over the period of time.

For example, in one embodiment, each server 115 can derive the number of I/O operations per second at each storage device by dividing the total number of I/O operations by the period of time of the observation interval. The number of I/O operations per second is also equal to the sum of the number of read operations per second and the number of write operations per second. Thus, if one the number of read operations and the number of write operations is known for each observation interval, each server 115 can derive the number of read operations per second at each storage device by dividing the number of read operations by the period of time of the observation interval, and can derive the number of write operations per second at each storage device by dividing the number of write operations by the period of time of the observation interval.

The utilization of each storage device is the ratio of the time the particular storage device is busy performing I/O operations (e.g., in seconds) to a total observation interval (e.g., in seconds). As such, each server 115 can derive percent utilization of each storage device by computing a ratio of the time the particular storage device is busy performing I/O operations (e.g., in seconds) to a total observation interval (e.g., in seconds) and multiplying the result by 100.

Each server 115 can derive the average service time for a read request at each storage device by dividing the utilization of each storage device by throughput (i.e., the number of read operations per second), and can derive the average service time for a write request at each storage device by dividing the utilization of each storage device by throughput (i.e., the number of write operations per second). As noted above, the utilization is the ratio of the time the particular storage device is busy performing I/O operations (e.g., in seconds) to a total observation interval (e.g., in seconds)

Each server 115 can derive the read volume per second (megabytes per second) at each storage device by dividing the read volume by the period of time of the observation interval, and can derive the write volume per second (megabytes per second) at each storage device by dividing the write volume by the period of time of the observation interval.

Each server 115 can derive the (average) read queue size at each storage device by multiplying the read request arrival rate by the average wait time for a read request, and can derive the (average) write queue size at each storage device by multiplying the write request arrival rate by the average wait time for a write request. The read request arrival rate is equal to the inverse of the time between consecutive read requests, and the write request arrival rate is equal to the inverse of the time between consecutive write requests. As such, each server 115 can also derive the (average) read queue size at each storage device by dividing the time taken for a read operation to finish by the time between consecutive read requests, and can also derive the (average) write queue size at each storage device by dividing the time taken for a write operation to finish by the time between consecutive write requests.

The server 115 includes at least one processing system and a non-transitory computer-readable storage media encoded with computer-executable instructions that, when loaded into the processing system, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions specify how its processing system(s) transitions between states to perform various acts described below with reference to FIG. 4.

The local metric collection database 120 at each data center 110 collects the high-level health metrics from each server 115, and provides the health metrics to database 140.

The database 140 serves as a main metric collection point that stores the high-level health metrics received from the local metric collection databases 120 from multiple, distributed data centers 110. The data centers 110 can collectively include a very large number of server clusters. The database 140 serves as a central aggregation point that gives users access to a global view of the high-level metrics collected from the data centers 110. The database 140 allows users of clients 160 to correlate the high-level metrics from the different data centers 110 and construct a global view of the system from the high-level metrics for each of the servers 115. This can allow the user to determine how many clusters in each data center 110 have problematic storage devices, how many data centers have problematic server clusters, etc.

The database 140 is coupled to a number of servers 145 that collectively function as a monitoring system 150. While only three servers 145 are illustrated in FIGS. 1A and 1B, the "monitoring system" can include any number of server machines that individually or jointly execute a set (or multiple sets) of instructions to perform any one or more of the methodologies discussed herein The processing system(s) of the server 145 can access computer-readable storage media and execute computer-executable instructions stored therein to cause the server 145 to potentially detect, based on the high-level health metrics, one or more faulty storage devices in the RAID-based storage system at each server 115. Upon detecting one or more faulty storage devices 222 the server 145 can generate a fault indication (for each storage device that has been determined to have failed). The server 145 may be connected (e.g., networked) to other machines in a LAN, an intranet, an extranet, or the Internet. The processing system(s) of the server 145 can execute instructions to cause the server 145 to generate an alert message to alert relevant service owners about the failure of those particular storage device(s) for which a fault indication was generated.

Figure 2:
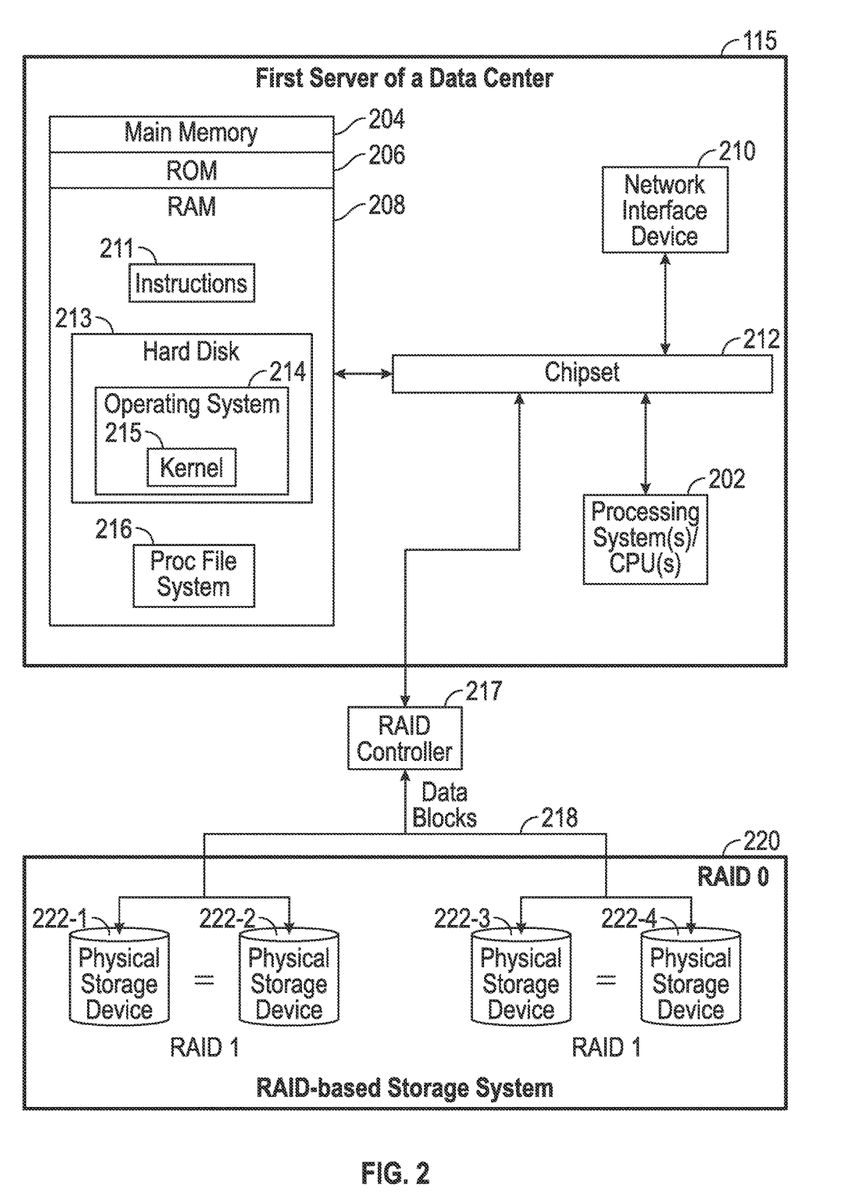
FIG. 2 is a schematic block diagram of a server in accordance with the disclosed embodiments.

FIG. 2 is a schematic block diagram of a server system in accordance with an embodiment. The server system can include a server 115 and a RAID-based storage system 220.

Depending on the implementation, the RAID-based storage system 220 can either be part of the server 115 or coupled to the server 115. For example, the RAID-based storage system 220 can be co-located in the same enclosure as the server 115 or located in an external housing that is coupled to the server 115. As such, in one embodiment, a RAID controller 217 and the RAID-based storage system 220 can be implemented as part of the server 115. In another embodiment, the RAID controller 217 and the RAID-based storage system 220 are separate components that are communicatively coupled to the server 115.

The server 115 can include one or more processing system(s) 202, main memory 204, a network interface device (MD) 210, a chipset 212, and may optionally include the RAID controller 217 and the RAID-based storage system 220. It will be appreciated that the server 115 may not include all of the components shown in FIG. 2, may include other components that are not explicitly shown in FIG. 2, or may utilize an architecture completely different than that shown in FIG. 2.

The chipset 212 is usually located on a motherboard of the server 115. The chipset 212 is a set of electronic components (e.g., in an integrated circuit) that interconnects and manages the data flow between the processing system(s) 202 and other elements of the server 115 and any peripherals, such as the RAID-based storage system 220, that are connected to the server 115. For instance, the chipset 212 provides an interface between the processing system(s) 202 and the main memory 204, and also includes functionality for providing network connectivity through the NID 210, such as a gigabit Ethernet adapter. The chipset 212 typically contains the processor bus interface (also known as a front-side bus), memory controllers, bus controllers, I/O controllers, etc.

Processing system(s) 202 represents one or more general-purpose processing devices such as a microprocessor, central processing unit, or the like. More particularly, the processing system(s) 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 202 may also be one or more special-purpose processing devices such as an application specific integrated circuit (ASIC), a field programmable gate array (FPGA), a digital signal processor (DSP), network processor, or the like.

The processing system(s) 202 can include one or more central processing units ("CPUs") that operate in conjunction with the chipset 212. The processing system(s) 202 perform arithmetic and logical operations necessary for the operation of the server 115. The processing system(s) 202 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 210 is capable of connecting the server 115 to other computers over the network 130. The network 130 can be an Ethernet or Gigabyte Ethernet LAN, a fiber ring, a fiber star, wireless, optical, satellite, a WAN, a MAN, or any other network technology, topology, protocol, or combination thereof.

The chipset 212 can provide an interface to various forms of computer-readable storage media including a main memory 204 (e.g., read-only memory (ROM), flash memory, dynamic random access memory (DRAM) such as synchronous DRAM (SDRAM)), and storage devices 222 of the RAID-based storage system 220. The processing system(s) 202 can communicate with the various forms for computer-readable storage media via the chipset 212 and appropriate buses.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 202) may be distributed throughout the server 115. The RAM 208 includes programs/instruction 211, an operating system 214 that include a kernel 215, and a proc file system 216.

The RAM 208 stores instructions 211 or executable code for one or more programs that can be loaded and executed at processing system(s) 202 to perform some of the various server functions that will be described below. For example, as will be explained below, the processing system(s) 202 executes instructions to sample lower-level health metrics for each of the storage devices 222 at that server at regular intervals, and to communicate the lower-level health metrics to a local metric collection database 120 for its data center 110.

The ROM of the main memory 204 can be used to store firmware that includes program code containing the basic routines that help to start up the server 115 and to transfer information between elements within the server 115. The ROM of the main memory 204 may also store other software components necessary for the operation of the server 115 in accordance with the embodiments described herein.

The operating system 214 its kernel 215, and the proc file system 216 will be described in greater detail below.

The server 115 includes or is connected to a redundant array of independent disks (RAID) type storage system that will be referred to herein as a RAID-based storage system 220. The RAID-based storage system 220 illustrated in FIG. 2 includes a number of physical storage devices 222. Although FIG. 2 illustrates four storage devices 222 it will be appreciated that a different number can be included depending on the implementation.

The RAID-based storage system 220 can be compliant with any RAID scheme that employs redundant storage devices and replicates data to each of the multiple storage devices for redundancy/fault-tolerance. When all storage devices in such RAID-based storage systems are operating without faults or failures they should have substantially equal utilization. For example, in one embodiment, the storage devices 222 are organized into a RAID10 array, such as Linux MD RAID10 array. RAID10 is a hybrid of RAID1 and RAID0. The particular RAID scheme that is utilized for the RAID array 220 may depend on a number of factors, such as the redundancy level, performance requirements, and reliability of the array desired. More information about the various standard RAID levels and their associated data formats that are standardized by the Storage Networking Industry Association (SNIA) can be found in the Common RAID Disk Drive Format (DDF) standard. "Common RAID Disk Drive Format (DDF) standard" at SNIA.org.

The storage devices 222 are logically presented to the software that executes at the processing system(s) 202 as one device. Software running on system will see one mount point (such as /data) in the file system to access the RAID, which behind the scene replicates the data to each of the multiple storage devices 222 for redundancy/fault-tolerance.

In addition, it should be appreciated that the type of storage devices can vary depending on the implementation. For example, in one embodiment, the storage devices 222 can be implemented using hard disk drives (HDDs). The HDDs comprise one or more rotating disks, each coated with a magnetic medium. These disks rotate at a rate of several thousand rotations per minute for several hours daily. In addition, a magnetic actuator is responsible for positioning magnetic read/write devices over the rotating disks. These actuators are subject to friction, wear, vibrations and mechanical misalignments, which result in reliability issues.

In another embodiment, the storage devices 222 can be implemented using Solid-State Disks (SSDs) also commonly referred to as Solid-State Drives. An SSD may emulate a HDD interface, but an SSD utilizes solid-state memory to store persistent data rather than electromechanical devices as found in a HDD. For example, an SSD may comprise banks of Flash memory. Without moving parts or mechanical delays, an SSD may have a lower access time and latency than a HDD. However, SSD typically have significant write latencies. In addition to different input/output (I/O) characteristics, an SSD experiences different failure modes than a HDD.

The storage devices 222 provide the data storage capacity required for the server 115 to store data and service I/O operations initiated by client computers (not illustrated) over the network 130.

The RAID controller 217 allows the server 115 to communicate with the storage devices 222. The RAID controller 217 may interface with the storage devices 222 through a serial advanced technology attachment ("SATA") interface, a small computer system interface ("SCSI"), a fiber channel ("FC") interface, a serial attached SCSI interface, or other standard interface for physically connecting and transferring data between computers and physical storage devices. In addition, the RAID controller 217 may include hardware-level RAID services.

The storage devices 222 may be connected to chipset 212 of the server 115 through a bus, such as a PCIe bus, that allows the RAID controller 217 to communicate with the storage devices 222.

The server 115 may store data on the storage devices 222 by transforming the physical state of the device to reflect the information being stored. The specific transformation of physical state can depend on factors such as the technology used to implement the physical storage devices. For example, the server 115 may store data to the storage devices 222 by issuing instructions to the RAID controller 217 to alter the magnetic characteristics of particular locations within the physical disk drives. These transformations may also include altering the physical features or characteristics of other media types, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The server 115 may further read information from the storage devices 222 by detecting the physical states or characteristics of one or more particular locations within the devices.

In RAID-based storage systems, all of the storage devices should have a uniform device-level utilization. As will be explained below with reference to FIG. 4, the disclosed embodiments can exploit this property to detect failure of an individual storage device by comparing one or more high-level health metrics of each individual storage device with corresponding values of metrics for each of the other storage devices on the same server.

The main memory 204 can include a hard disk 213 stores operating system 214 software that controls the operation of the server 115 and manages computer hardware and software resources and provides common services for computer programs executed by the processing system(s) 202. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. Regardless of the implementation, the operating system 214 includes many different "components" that make the different parts of the server 115 work together.

One component of the operating system 214 is the kernel 215. The kernel 215 is the part of the operating system 214 that manages input/output requests from software, and translates them into data processing instructions for the central processing unit and other electronic components of a computer. The kernel 215 provides the most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc.

The main memory 204 also includes a proc file system 216 stores lower-level health metrics monitored from the kernel 215 of the operating system 214. The proc file system 216 is completely managed by the kernel 215, and is stored in the main memory 204 (e.g., RAM). The proc file system 216 is not a file system in a traditional sense, but rather is a portion of memory 204 that holds information for the system. The proc file system 216 is a pseudo-file system that contains details about all the current running processes, and can be used as an interface to kernel data structures. The proc file system 216 is a pseudo-file system since it is stored in memory and not on disk like other file systems. The proc file system 216 allows access the underlying kernel 215 data structures so that kernel 215 can send information to processes. This is an interface provided to the user to interact with the kernel 215 and obtain the required information about processes running on the system. It is commonly mounted at /proc.

Among other things, the kernel 215 stores I/O metrics associated with storage devices 222 in a /proc/diskstats file at the proc file system 216. Commands like iostats fetches its information from the proc/diskstats file. For more details refer to https://www.kernel 215.org/doc/Documentation/iostats.txt. These lower-level health metrics for each of the storage devices 222 includes information regarding reads, writes, reads completed, writes completed, time spent on reading, sectors written, etc. In one implementation, for each storage device storage devices 222, the proc/diskstats file includes information including: major number, minor number, device name, and metrics for: reads completed successfully, reads merged, sectors read, time spent reading (ms), writes completed, writes merged, sectors written, time spent writing (ms), I/Os currently in progress, time spent doing I/Os (ms), and weighted time spent doing I/Os (ms). Depending on the implementation some or all of the information included in the proc/diskstats file can be used as lower-level health metrics.

In accordance with the disclosed embodiments, each server 115 (at each data center 110) monitors lower-level health metrics from the kernel 215 and forwards them to the local metric collection database 120 at each data center 110. For example, each server 115 can run a collection daemon (or similar program) that can sample these lower-level health metrics (e.g., once every minute) from the proc/diskstats file of the proc file system 216 (that serves as an interface to the kernel 215). The lower-level health metrics can include, for example, cumulative number of reads and writes completed; cumulative volume of reads and writes (e.g., total number of bytes read and number of bytes written); and cumulative time spent in I/O (e.g., total time spent reading and the total time spent writing in milliseconds), etc.

Figure 3:
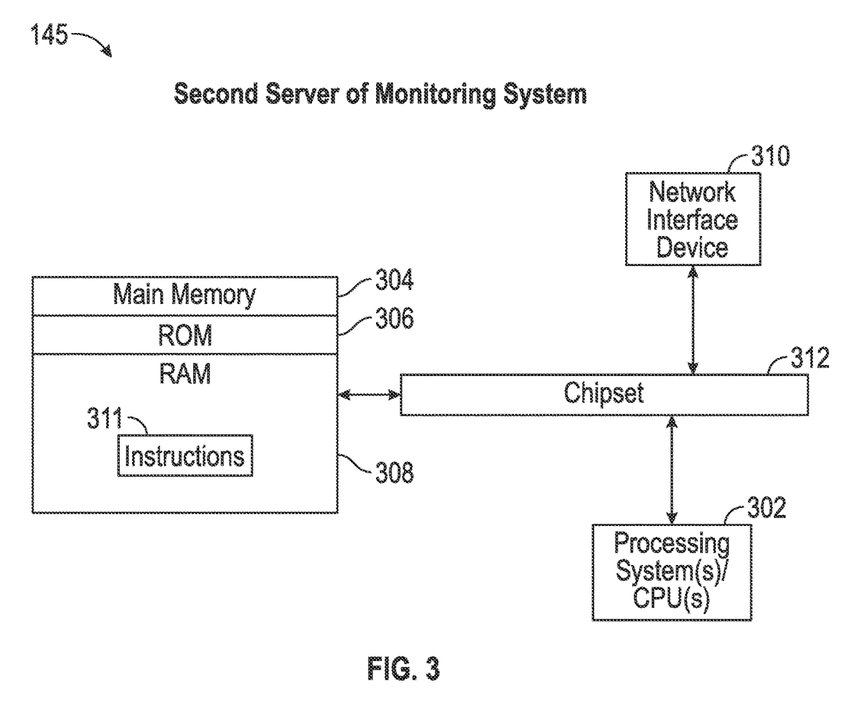
FIG. 3 is a schematic block diagram of a server that is part of a monitoring system in accordance with the disclosed embodiments.

FIG. 3 is a schematic block diagram of a server 145 that is part of the monitoring system 150 in accordance with the disclosed embodiments. The exemplary server 145 includes one or more processing system(s) 302, a main memory 304 that includes ROM 305 and RAM 308, a NID 310 and a chipset 312. The processing system(s) 302, main memory 304, the NID 310 and chipset 312 can include features of the corresponding elements that are described with reference to FIG. 2. The server 145 may also include other input and output devices that are not illustrated in FIG. 3 for sake of simplicity.

The processing system(s) 302 communicates with main memory 304 and the NID 310 via chipset 312 and appropriate buses. The NID 310 allows the server 145 to be connected (e.g., networked) to other machines in a LAN, an intranet, an extranet, or the Internet.

The main memory 304 includes a computer-readable medium on which is stored one or more sets of instructions 311. The processing system(s) 302 of the server 145 can load and execute the instructions 311 to cause the processing device 302 to detect one or more faulty storage devices 222 in the RAID-based storage system 220 that is implemented at each server 115. For example, in one embodiment, for each of the storage devices 222, the server 145 determines if one or more of the high-level health metrics indicates that this storage device 222 has been inactive over extended period of time, and if so determines if any of the other storage devices 222 on the same first server 115 have also been determined to be inactive over the same extended period of time. When the server 145 determines that any of the other storage devices 222 on the same server 115 have also been inactive over an extended period of time, the server 145 can generate a fault indication for each storage device 222 that was determined to have be inactive over the extended period of time (and has therefore failed), as well as an alert message to alert relevant service owners about the failure of those particular storage device(s) for which a fault indication was generated.

Various functions performed by the processing system(s) 302 upon loading and executing the instructions 311 be described in greater detail with reference to FIG. 4

Figure 4:
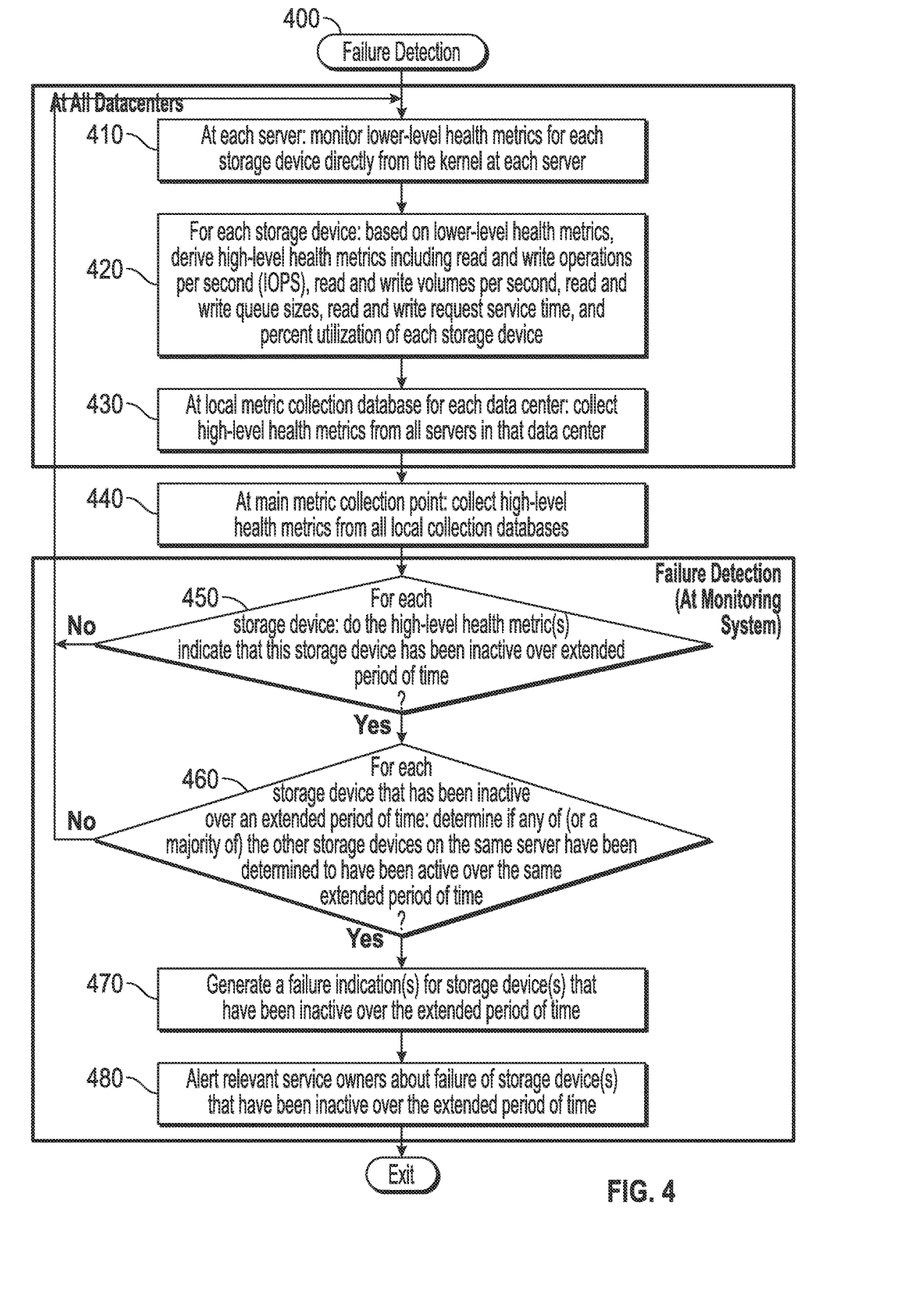
FIG. 4 is a flow chart illustrating an exemplary method for detecting one or more faulty storage devices in redundant array of independent disks (RAID) that are implemented in conjunction with a server at a data center in accordance with an embodiment.

FIG. 4 is a flow chart illustrating an exemplary method 400 for detecting one or more faulty storage devices 222 in redundant array of independent disks (RAID) 220 that are implemented in conjunction with a server 115 at a data center 110 in accordance with an embodiment. FIG. 4 will be described with reference to FIGS. 1-3.

At 410, each server 115 (at each data center 110) monitors lower-level health metrics from the kernel 215 at each server 115 and provides these lower-level health metrics to a local metric collection database 120 for that data center 110.

As noted above, in one non-limiting embodiment, the lower-level health metrics for each storage device 222 can include, for example, a cumulative number of reads made by each storage device during a period of time (referred to herein as a sampling, monitoring or observation interval), a cumulative number of writes completed by each storage device during the period of time, a cumulative volume of reads made by each storage device during the period of time (e.g., total number of bytes read during an observation interval), a cumulative volume of writes completed by each storage device during a period of time (e.g., total number of bytes written during an observation interval), cumulative time spent in I/O (e.g., total time spent reading and the total time spent writing during an observation interval). In one embodiment, the kernel 215 exposes these lower-level health metrics to user space through the proc/diskstats file.

In one embodiment, lower-level health metrics from the kernel 215 are exposed to user space through proc file system 216 that is maintained in memory 204. The proc file system 216 is not a file system in a traditional sense, but rather is a portion of memory 204 that holds information for the system including the lower-level health metrics for each of the storage devices 222. In one embodiment, a collection daemon running at each server 115 can sample these lower-level health metrics from the proc file system 216 at particular observation interval (e.g., once every minute) and forward them to the local metric collection database 120 at each data center 110.

At 420, each of the servers 115 processes the lower-level health metrics from each of the storage devices 222 at that particular server 115 to generate high-level health metrics for each of the storage devices 222 from that particular server 115. As noted above, the high-level health metrics for each storage device 222 can include, but are not limited to: the number of read and write operations per second (I/O operations per second) at each storage device 220; read and write volumes per second (megabytes per second) at each storage device 220; read and write queue sizes at each storage device 220; read and write request service time at each storage device 220; and percent utilization of each storage device 220.

At 430, the local metric collection database 120 at each data center 110 collects the high-level health metrics from each server 115.

At 440, the database 140 functions as a main metric collection point that receives and stores the high-level health metrics provided from each server 115.

As noted above, the monitoring system 150 can include a plurality of servers 145 that are used to process the high-level health metrics that are stored in the database 140. In the description that follows, steps 450 through 480 will be described with reference to a single server 145 that performs various steps to process lower-level health metrics from a single server 115; however, it is to be appreciated that each of the servers 145 in the monitoring system can performs that steps that are described in 450 through 480 on different sets of lower-level health metrics from various servers 115 regardless of the data center 110 that the servers belong to.

At 450, for each of the storage devices 222 of a particular server 115, the server 145 determines if one or more of the high-level health metrics indicates that this storage device 222 has been inactive over extended period of time. In one embodiment, "an extended period of time" means a time period significantly greater than the observation interval that the health metrics are monitored or sampled at. For example, in one non-limiting implementation, if the observation interval over which the health metrics are sampled/monitored/observed is once every minute, then the extended period of time could be, for instance, on the order of an hour (or 60 observation intervals). The extended period of time should be set so that it is sufficient to ensure that the storage device has actually failed and is not performing input/output operations over a number of the health metric monitoring/observation intervals. Depending on the implementation, the "extended period of time" can be configured so that it is sufficient to allow the monitoring system to differentiate between an actual failure of a storage device and temporary network issues that may cause health metrics to have abnormally low values during a small number of observation intervals. To determine "inactivity" any combination of the high-level health metrics can be used to make this determination. The complexity of this determination can vary depending on the implementation. In some implementations, only a single high-level health metric needs to be evaluated to make a determination of inactivity, whereas in other implementations, different combinations of the high-level health metrics can be used to make a determination of inactivity. In other words, any of the high-level health metrics (alone or in combination) can be evaluated to determine if a particular storage device 222 has been inactive during a certain period. For example, in one embodiment, the monitoring system can compare each one of the high-level health metrics to an activity threshold for that particular high-level health metric. In one embodiment, if one of the high-level health metrics falls below the activity threshold for that particular high-level health metric, then the storage device is determined to be inactive. In another embodiment, if more than one of the high-level health metrics fall below their corresponding activity thresholds, then the storage device is determined to be inactive. In another embodiment, if all of the high-level health metrics fall below their corresponding activity thresholds, then the storage device is determined to be inactive.

For any individual storage devices 222 that are determined to have been inactive over the extended period of time, the method proceeds to 460, where the server 145 determines if one or more of the other storage devices 222 of the same server 115 were determined to have been active over the same extended period of time. At 460, as with step 450, one or any combination of the high-level health metrics can be determine each of the storage device's status as active or inactive, but the server 145 should use the same metrics that were utilized at step 450 so that the comparison between the different storage devices 222 is consistent. Further, in one non-limiting implementation of 460, before proceeding to 470, the server 145 can determine if a majority of the other storage devices 222 of the same server 115 have also been determined to be active over the same extended period of time.

For instance, in one non-limiting implementation of 450, for each of the storage devices 222 at the server 115, the server 145 can determine if that particular storage device 222 has a zero percent utilization over an extended period of time, and then at 460 the server 145 can determine if any (or a majority of) the other storage devices 222 at the same server 115 had significantly greater than zero percent utilization, and if so, the method 400 will proceed to 470. A percent value for what constitutes "significantly greater than zero percent utilization" is configurable and can vary depending on the implementation. For example, in one embodiment, "significantly greater than zero percent utilization" means greater than five percent utilization. Although this implementation can be useful, it can be beneficial in some embodiments, if the server 145 evaluates other high-level health metrics (i.e., other than utilization) and/or lower-level health metrics for each storage device 222 to assess whether any particular storage device 222 is failing, before proceeding from 460 to 470. By evaluating additional metrics other than utilization (e.g., information regarding the volumes of reads/writes, their latencies, sizes, etc.), this can help ensure that only the faulty storage devices 222 are not actually taking I/O load and thus help to avoid false positives in the detection process.

Referring again to FIG. 4, when the server 145 determines (at 460) that any of the other storage devices 222 on the same server have been active over an extended period of time, the method proceeds to 470, where the server 145 generates a fault indication for each storage device 222 that was determined to have be inactive over the extended period of time, while another storage device 222 (or a majority of other storage devices 222) of the same server 115 have been determined to be active during the same extended period of time. Each fault indication indicates that a particular storage device 222 has failed, and can include a device identifier that identifies that particular storage device 222 that has failed, and can also include identifiers that identify the particular server cluster and/or data center that server belongs to. Further, in some embodiments, at 480, the server 145 can also generate an alert message to alert relevant service owners about failure of those particular storage devices 222 for which a fault indication was generated at 470.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A system, comprising:
   a plurality of data centers, wherein each data center comprises:
      a plurality of first servers, wherein each first server is associated with redundant array of independent disks (RAID) that are implemented in conjunction with that first server, and wherein each first server is configured to: monitor lower-level health metrics that characterize read and write activity for each storage device at that server over a period of time of an observation interval; and process the lower-level health metrics to generate high-level health metrics for each storage device that are indicative of activity of each storage device over the period of time of the observation interval;
      a local metric collection database configured to receive the lower-level health metrics from each of the servers for that data center;
   a database that is configured to receive and store the lower-level health metrics from each of the local metric collection databases for each of the data centers;
   a monitoring system comprising at least one second server being configured to:
      determine, for each of the storage devices based on one or more of the high-level health metrics for that storage device, whether each particular storage device has been inactive over an extended period of time;
      determine, for each of the storage devices that are determined to have been inactive over the extended period of time, if any of the other storage devices at the same first server have been determined to have been active over the same extended period of time; and generate a fault indication for each storage device that was determined to have be inactive over the extended period of time while another storage device at the same first server was determined to have been active during the same extended period of time.

2. The system of claim 1, wherein each first server comprises:
  main memory comprising:
    an operating system comprising a kernel that exposes the lower-level health metrics; and
    a proc file system that serves as an interface to the kernel, wherein the lower-level health metrics from the kernel are exposed to user space through the proc file system that is maintained in the main memory; and
  wherein each first server is configured to: monitor lower-level health metrics for each of the storage devices by sampling the lower-level health metrics at regular intervals from the proc file system via a collection daemon that runs at the first server.

3. The system of claim 1, wherein the lower-level health metrics comprise:
  a cumulative number of reads made by each storage device during the period of time of the observation interval;
  a cumulative number of writes completed by each storage device during the period of time of the observation interval;
  a cumulative volume of reads made by each storage device during the period of time of the observation interval;
  a cumulative volume of writes completed by each storage device during the period of time of the observation interval;
  a total time spent reading by each storage device during the period of time of the observation interval; and
  a total time spent writing by each storage device during the period of time of the observation interval.

4. The system of claim 1, wherein the high-level health metrics comprise:
  a number of read and write operations per second at each storage device during the period of time of the observation interval;
  read and write volumes per second at each storage device during the period of time of the observation interval;
  read and write queue sizes at each storage device during the period of time of the observation interval;
  read and write request service time at each storage device during the period of time of the observation interval; and
  a percent utilization of each storage device during the period of time of the observation interval.

5. The system of claim 4, wherein each first server is configured to:
  derive the number of read operations per second at each storage device by dividing the number of read operations by the period of time of the observation interval;
  derive the number of write operations per second at each storage device by dividing the number of write operations by the period of time of the observation interval;
  derive a utilization of each storage device by computing a ratio of the time the particular storage device is busy performing I/O operations to the observation interval;
  derive a percent utilization of each storage device by multiplying the utilization of each storage device by one-hundred;
  derive an average service time for a read request at each storage device by dividing the utilization of each storage device by the number of read operations per second;
  derive the average service time for a write request at each storage device by dividing the utilization of each storage device by the number of write operations per second;
  derive a read volume per second at each storage device by dividing a read volume by the period of time of the observation interval;
  derive a write volume per second at each storage device by dividing a write volume by the period of time of the observation interval;
  derive an average read queue size at each storage device by multiplying a read request arrival rate by an average wait time for a read request, wherein the read request arrival rate is equal to an inverse of a time between consecutive read requests; and
  derive an average write queue size at each storage device by multiplying a write request arrival rate by an average wait time for a write request, wherein the write request arrival rate is equal to an inverse of a time between consecutive write requests.

6. The system of claim 1, wherein the second server is configured to determine whether each particular storage device has been inactive during the extended period of time based on evaluation of a particular one of the high-level health metrics for that storage device that indicates that this particular storage device has been inactive over the extended period of time.

7. The system of claim 1, wherein the second server of the monitoring system is configured to determine whether each particular storage device has been inactive during the extended period of time based on a combination of the high-level health metrics for that particular storage device.

8. The system of claim 1, wherein the second server is configured to:
  determine, for each of the storage devices that are determined to have been inactive over the extended period of time, if a majority of the other storage devices at the same first server have been determined to have been active over the same extended period of time; and
  when the second server determines that the majority of the other storage devices at the same first server have been active over the extended period of time:
  generate the fault indication for each storage device that was determined to have be inactive over the extended period of time while the majority of the other storage devices at the same first server were determined to have been active during the same extended period of time,
  wherein each fault indication indicates that a particular storage device has failed via a device identifier that identifies that particular storage device.

9. The system of claim 1, wherein the second server is further configured to communicate an alert message for each of the particular storage devices for which a fault indication was generated, wherein each alert message provides an alert to relevant service owners about the failure a particular storage device.

10. A computer-implemented method for detecting one or more faulty storage devices in redundant array of independent disks (RAID) that is implemented in conjunction with a first server at a data center, the method comprising:
  at the first server: monitoring, for each of the storage devices, lower-level health metrics that characterize read and write activity of each storage device over a period of time of an observation interval;

processing, at a the first server, the lower-level health metrics to generate high-level health metrics for each of the storage devices over the period of time of the observation interval, wherein the high-level health metrics are indicative of activity of each storage device over the period of time of the observation interval;

determining, at a second server of a monitoring system, whether each particular storage device at the first server has been inactive over an extended period of time based on one or more of the high-level health metrics for that storage device;

determining, at the second server, for each of the storage devices that are determined to have been inactive over the extended period of time, if any of the other storage devices at the first server have been determined to have been active over the same extended period of time; and generating, at the second server when the second server determines that any of the other storage devices at the first server have been active over the extended period of time, a fault indication for each storage device that was determined to have be inactive over the extended period of time while another storage device at the first server was determined to have been active during the same extended period of time.

11. The computer-implemented method of claim 10, wherein the first server comprises: main memory comprising: an operating system comprising a kernel that generates the lower-level health metrics; and a proc file system that serves as an interface to the kernel; and wherein the lower-level health metrics from the kernel are exposed to user space through the proc file system that is maintained in the main memory, and wherein the step of monitoring, comprises:

sampling the lower-level health metrics at regular intervals from the proc file system via a collection daemon that runs at the first server.

12. The computer-implemented method of claim 10, wherein the lower-level health metrics comprise:

a cumulative number of reads made by each storage device during the period of time of the observation interval;

a cumulative number of writes completed by each storage device during the period of time of the observation interval;

a cumulative volume of reads made by each storage device during the period of time of the observation interval;

a cumulative volume of writes completed by each storage device during the period of time of the observation interval;

a total time spent reading by each storage device during the period of time of the observation interval; and a total time spent writing by each storage device during the period of time of the observation interval.

13. The computer-implemented method of claim 10, wherein the high-level health metrics comprise:

a number of read and write operations per second at each storage device during the period of time of the observation interval;

read and write volumes per second at each storage device during the period of time of the observation interval;

read and write queue sizes at each storage device during the period of time of the observation interval;

read and write request service time at each storage device during the period of time of the observation interval; and a percent utilization of each storage device during the period of time of the observation interval.

14. The computer-implemented method of claim 13, wherein the step of processing, at the first server, the lower-level health metrics to generate high-level health metrics for each of the storage devices over the period of time, comprises:

deriving, at the first server, the number of read operations per second at each storage device by dividing the number of read operations by the period of time of the observation interval;

deriving, at the first server, the number of write operations per second at each storage device by dividing the number of write operations by the period of time of the observation interval;

deriving, at the first server, a utilization of each storage device by computing a ratio of the time the particular storage device is busy performing I/O operations to the observation interval;

deriving, at the first server, a percent utilization of each storage device by multiplying the utilization of each storage device by one-hundred;

deriving, at the first server, an average service time for a read request at each storage device by dividing the utilization of each storage device by the number of read operations per second;

deriving, at the first server, the average service time for a write request at each storage device by dividing the utilization of each storage device by the number of write operations per second.

deriving, at the first server, a read volume per second at each storage device by dividing a read volume by the period of time of the observation interval;

deriving, at the first server, a write volume per second at each storage device by dividing a write volume by the period of time of the observation interval;

deriving, at the first server, an average read queue size at each storage device by multiplying a read request arrival rate by an average wait time for a read request, wherein the read request arrival rate is equal to an inverse of a time between consecutive read requests;

deriving, at the first server, an average write queue size at each storage device by multiplying a write request arrival rate by an average wait time for a write request, wherein the write request arrival rate is equal to an inverse of a time between consecutive write requests.

15. The computer-implemented method of claim 10, wherein determining, at the second server of the monitoring system, whether each particular storage device at the first server has been inactive over the extended period of time based on one or more of the high-level health metrics for that storage device, comprises:

determining, at the second server of the monitoring system, whether each particular storage device has been inactive during the extended period of time based on evaluation of a particular one of the high-level health metrics for that storage device that indicates that this particular storage device has been inactive over the extended period of time.

16. The computer-implemented method of claim 10, wherein determining at the monitoring system for each of the storage devices at that first server, based on the one or more of the high-level health metrics for that storage device, whether each particular storage device has been inactive during the extended period of time, comprises:

determining, at the second server of the monitoring system, whether each particular storage device has been inactive during the extended period of time based on a combination of the high-level health metrics for that particular storage device.

17. The computer-implemented method of claim 10, wherein the step of determining, at the second server, for each of the storage devices that are determined to have been inactive over the extended period of time, if any of the other storage devices at the first server have been determined to have been active over the same extended period of time, comprises:

determining, at the second server for each of the storage devices that are determined to have been inactive over the extended period of time, if a majority of the other storage devices at the first server have been determined to have been active over the same extended period of time; and   wherein the step of generating comprises:

generating, at the second server when the second server determines that the majority of the other storage devices at the first server have been active over the extended period of time, a fault indication for each storage device that was determined to have be inactive over the extended period of time while the majority of the other storage devices at the first server were determined to have been active during the same extended period of time, wherein each fault indication indicates that a particular storage device has failed via a device identifier that identifies that particular storage device.

18. The computer-implemented method of claim 10, further comprising:

communicating, from the second server, an alert message for each of the particular storage devices for which a fault indication was generated, wherein each alert message provides an alert to relevant service owners about the failure of a particular storage device.

19. A method for detecting one or more faulty storage devices in an enterprise environment comprising a plurality of data centers each data center comprising a plurality of first servers, wherein each first server is associated with redundant array of independent disks (RAID) that are implemented in conjunction with that first server, the method comprising:

sampling, at each of the first servers, lower-level health metrics for each of the storage devices at that server at regular intervals, wherein the lower-level health metrics for a particular storage device characterize read and write activity of that particular storage device over a period of time of an observation interval;

processing, at each of the first servers, the lower-level health metrics for each particular storage device to generate high-level health metrics for each particular storage device that are indicative of activity of that particular storage device over the period of time of the observation interval;

collecting, at a local metric collection database for each data center, the lower-level health metrics from each of the servers that are part of that data center;

forwarding the lower-level health metrics from each local metric collection database for each data center to a database that stores all of the lower-level health metrics at a database;

for each of the storage devices: determining, at computing infrastructure based on a combination of the high-level health metrics for that storage device, whether each particular storage device has been inactive over an extended period of time;

determining, at the computing infrastructure for each of the storage devices that are determined to have been inactive over the extended period of time, if a majority of the other storage devices at the same first server have been determined to have been active over the same extended period of time; and     generating, at the computing infrastructure, a fault indication for each storage device that was determined to have been inactive over the extended period of time when the majority of other storage devices at the same first server were determined to have been active during the same extended period of time, wherein each fault indication indicates that a particular storage device has failed via a device identifier that identifies that particular storage device.

20. The method of claim 19, wherein the high-level health metrics comprise:

a number of read and write operations per second at each storage device during the period of time of the observation interval;

read and write volumes per second at each storage device during the period of time of the observation interval;

read and write queue sizes at each storage device during the period of time of the observation interval;

read and write request service time at each storage device during the period of time of the observation interval; and     a percent utilization of each storage device during the period of time of the observation interval.

\* \* \* \* \*